United States Patent
Kulkarni et al.

(10) Patent No.: US 10,895,296 B2
(45) Date of Patent: Jan. 19, 2021

(54) ACTUATION MECHANISM

(71) Applicant: Meritor Heavy Vehicle Braking Systems (UK) Limited, Gwent (GB)

(72) Inventors: Sanjeev Kulkarni, Bangalore (IN); Martin Taylor, Gwent (GB); Arun Kumar, Bangalore (IN)

(73) Assignee: Meritor Heavy Vehicle Braking Systems (UK) Limited, Gwent (GB)

( * ) Notice: Subject to any disclaimer, the term of this patent is extended or adjusted under 35 U.S.C. 154(b) by 0 days.

(21) Appl. No.: 16/380,082

(22) Filed: Apr. 10, 2019

(65) Prior Publication Data

US 2019/0331181 A1 Oct. 31, 2019

(30) Foreign Application Priority Data

Apr. 30, 2018 (EP) .................................... 18170196

(51) Int. Cl.
*F16D 65/18* (2006.01)
*F16D 65/00* (2006.01)
*F16D 65/56* (2006.01)
*F16D 121/14* (2012.01)

(52) U.S. Cl.
CPC .......... *F16D 65/18* (2013.01); *F16D 65/0068* (2013.01); *F16D 65/567* (2013.01); *F16D 2121/14* (2013.01)

(58) Field of Classification Search
CPC .......... F16D 65/18; F16D 65/14; F16D 65/56; F16D 65/226; F16D 65/0068; F16D 65/567; F16D 2121/14
See application file for complete search history.

(56) References Cited

U.S. PATENT DOCUMENTS

| 3,967,705 | A |   | 7/1976  | Johannesen et al. |
|---|---|---|---|---|
| 4,544,045 | A |   | 10/1985 | Runkle |
| 5,433,298 | A | * | 7/1995  | Antony ................ F16D 65/183 188/72.7 |
| 5,664,646 | A | * | 9/1997  | Bejot ..................... F16D 65/18 188/71.9 |
| 5,833,035 | A | * | 11/1998 | Severinsson ........... F16D 65/18 188/72.7 |

(Continued)

FOREIGN PATENT DOCUMENTS

| CN | 200989401 Y | 12/2007 |
|---|---|---|
| CN | 102384192 A | 3/2012 |

(Continued)

OTHER PUBLICATIONS

European Patent Office, Extended European Search Report for corresponding European Application No. 18170196.2-1012, dated Dec. 7, 2018, 7 pages.

(Continued)

*Primary Examiner* — Bradley T King
*Assistant Examiner* — Mahbubar Rashid
(74) *Attorney, Agent, or Firm* — Brooks Kushman PC

(57) ABSTRACT

An operating shaft and an actuation mechanism for a disc brake. The actuation mechanism may include a wear adjuster mechanism and the operating shaft. The operating shaft may include opposed pairs of arcuate surfaces arranged with offset axes of rotation and a recess therebetween for accommodating a portion of the wear adjuster mechanism.

20 Claims, 9 Drawing Sheets

(56) References Cited

U.S. PATENT DOCUMENTS

| | | | |
|---|---|---|---|
| 6,766,885 B2 * | 7/2004 | Severinsson | F16D 65/18 188/71.9 |
| 8,590,675 B2 * | 11/2013 | Jungmann | F16D 65/18 188/71.9 |
| 9,062,727 B2 * | 6/2015 | Thomas | F16D 65/183 |
| 9,869,357 B2 | 1/2018 | Knoop et al. | |
| 2002/0014374 A1 * | 2/2002 | Ortegren | F16D 65/183 188/72.1 |
| 2004/0163899 A1 * | 8/2004 | Heinlein | F16D 65/568 188/72.1 |
| 2005/0284709 A1 * | 12/2005 | Sandberg | F16D 65/567 188/72.1 |
| 2007/0045060 A1 * | 3/2007 | Pettersson | F16D 65/18 188/72.1 |
| 2007/0256902 A1 * | 11/2007 | Niehorster | F16D 65/567 188/72.9 |
| 2012/0325595 A1 * | 12/2012 | Malki | F16D 65/0068 188/71.7 |

FOREIGN PATENT DOCUMENTS

| | | |
|---|---|---|
| CN | 105121893 A | 12/2015 |
| CN | 107532662 A | 1/2018 |
| GB | 2442552 A | 4/2008 |
| WO | 9612900 A1 | 5/1996 |
| WO | 2013083857 A2 | 6/2013 |
| WO | 2015004696 A1 | 1/2015 |

OTHER PUBLICATIONS

Chinese Office Action dated Apr. 3, 2020, for related Chinese Appln. No. 201910343564.8; 5 Pages.

India Examination Report dated Jul. 6, 2020, for related India Appln. No. 201914016453; 7 Pages.

\* cited by examiner

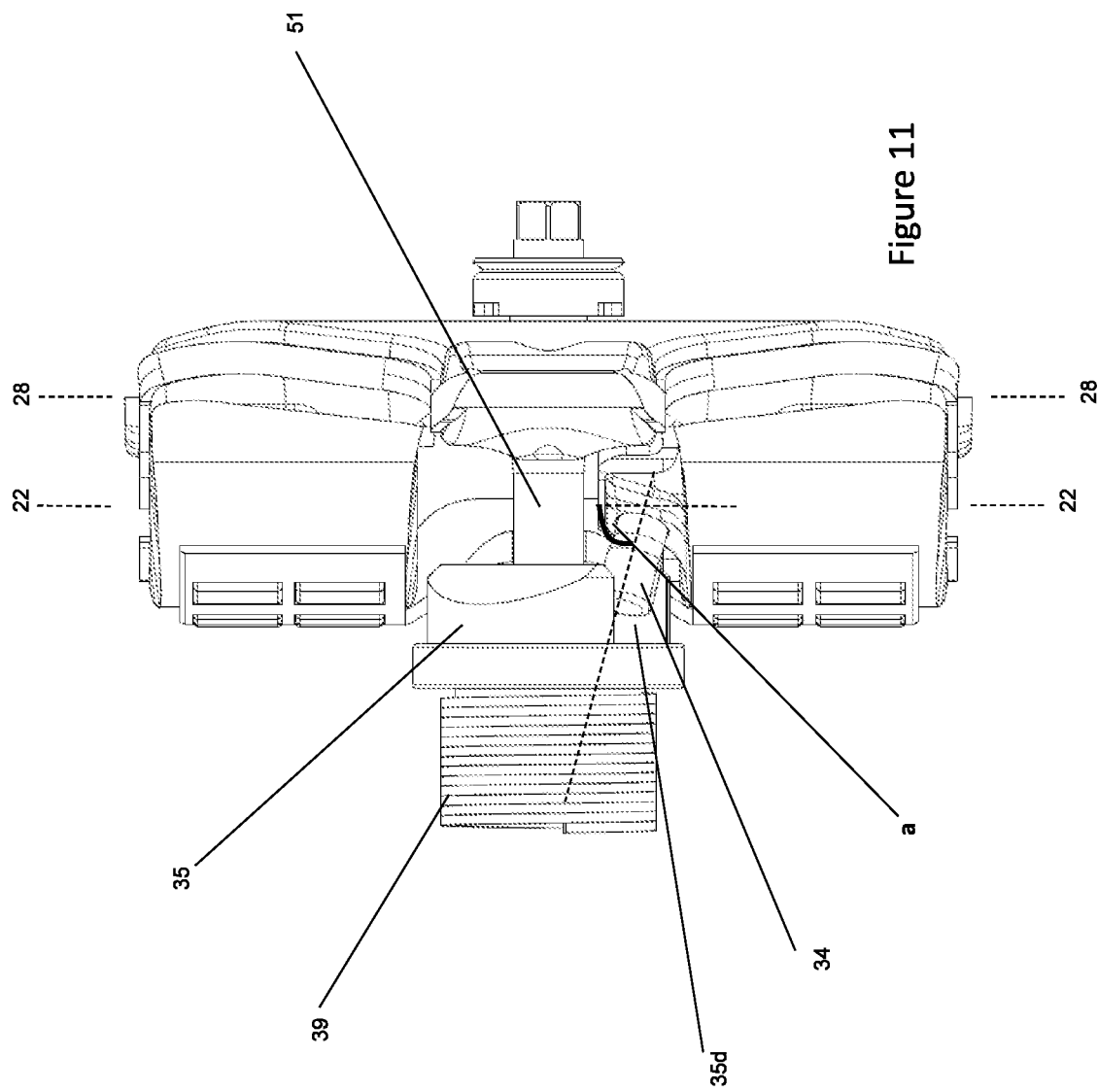

ACTUATION MECHANISM

TECHNICAL FIELD

The present teachings relate to an actuation mechanism for an air actuated disc brake. More particularly, but not exclusively, the present teachings relate to an operating shaft or input driving portion having a drive pin arranged to interact with a slot on the other of these two components.

BACKGROUND

In many air disc brakes, for use on heavy vehicles such as trucks and buses, an operating shaft is used to convert the relatively large movement of an air actuator to a smaller, higher force movement of friction elements (brake pads) of the brake to clamp a brake rotor and frictionally retard its rotation to effect braking of an associated wheel when the brake is actuated.

Typically, these brakes also include adjuster mechanisms to set the position of the friction elements having friction material relative to the brake rotor, to account for wear of the friction material and the rotor in brake use and maintain a desired "running clearance" between the friction material and rotor. The adjuster mechanism often has an input driving portion that is in communication with the operating shaft, so that when the gap between the friction material and the rotor is undesirably large, the operating shaft drives the driving portion, which then transmits a torque to the remainder of the adjuster mechanism, to cause a piston to extend and move the friction material towards the rotor.

When the friction material has almost fully worn away the brake pads require replacing with a new unworn set of greater thickness. Therefore, the adjuster mechanism must be manually rewound back to its starting position. A so-called manual adjuster shaft (MAS) that transmits drive from a tool such as a spanner or wrench at an input end at an accessible location on the exterior of the brake caliper to the adjuster mechanism is often provided for this purpose.

Some air disc brakes utilize a single extendible piston to account for wear and it is known for the manual adjuster shaft and adjuster mechanism to be co-axially arranged with this piston and have an input end accessible at an inboard face of the brake caliper housing.

This may allow for the disc brake to be lightweight and compact, but it is problematic for the adjuster drive from the operating shaft to be transmitted to the adjuster mechanism, whilst also having space to accommodate the manual adjuster shaft.

The present teachings seek to overcome or at least mitigate the problems of the prior art.

SUMMARY

A first aspect of the teachings provides an actuation mechanism for an air disc brake, comprising an operating shaft and a wear adjuster mechanism have an input driving portion, the operating shaft comprising opposed pairs of arcuate surfaces arranged with offset axes of rotation, one surface of each pair arranged to be grounded to a housing of the disc brake and the other surfaces of each pair arranged to transmit an actuating force to a brake pad of the disc brake upon rotation of the operating shaft; the operating shaft further comprising a recess intermediate the pairs of arcuate surfaces for accommodating a portion of the wear adjuster mechanism; and wherein one of the operating shaft and the input driving portion further comprises a pin arranged to engage a corresponding slot of the other of the operating shaft or input driving portion, the pin extending at a non-zero angle with respect to both the axes of rotation and a direction of force transmission.

The pin extending from one of the operating shaft and the input driving portion arranged at a non-zero angle creates sufficient space for the manual adjuster shaft to be arranged within the recess whilst allowing the pin to engage the input driving portion over the full range of motion of the operating shaft.

The pin may be a separate component from the operating shaft or input driving portion and is mounted thereto.

Advantageously, this may simplify manufacturing of the operating shaft or input driving portion and enable the pin to be separately hardened so as to enhance its durability.

The operating shaft or input driving portion may comprise a hole arranged to receive the pin.

The pin may be dimensioned to be a press-fit or interference fit within the hole.

Connecting the pin to the hole via a press-fit or interference fit may simplify assembly.

The pin may be provided with a part-spherical head.

This shape may reduce wear and stress on the pin in operation.

The part-spherical head of the pin may have a diameter greater than a shank of the pin.

This arrangement may further reduce wear and stress and maximize the angle over which the pin may operate to effect adjustment.

The pin may have a flattened region at an end remote from a shank thereof.

This reduces the volume the pin occupies, allowing the adjustment mechanism to be more compact, whilst ensuring smooth contact with the input driving portion or operating shaft.

The pin may have a flattened region on a surface that faces a lateral mid-point of the recess.

This reduces the volume the pin occupies and allows more space for a manual adjuster shaft, whilst ensuring smooth contact with the input driving portion or operating shaft.

The pin may extend adjacent to a wall defining a perimeter of the recess.

Locating the pin in this position may create more space in the center of the recess for the manual adjuster mechanism to be arranged.

The pin may be mounted to the operating shaft.

The operating shaft may comprise a tongue of material extending into the recess and the hole may be provided in the tongue.

Providing a tongue of material simplifies the construction and assembly of the pin.

The non-zero angle between the pin and one of the operating shaft and input driving portion may be between 55° and 85° with respect to the axes of rotation.

The actuation mechanism may be part of an air, hydraulic or electrically actuated disc brake.

The wear adjuster mechanism may comprise a manual adjuster shaft at least partially accommodated with the recess.

The pin may extend in a general direction of force application by the operating shaft.

A longitudinal axis of the pin may not intersect the axes of rotation of the surfaces.

A further aspect of the teachings provides an operating shaft for an air disc brake, the operating shaft comprising opposed pairs of arcuate surfaces arranged with offset axes of rotation, one surface of each pair arranged to be grounded to a housing of the disc brake and the other surfaces of each pair arranged to transmit an actuating force to a brake pad of the disc brake upon rotation of the operating shaft; the operating shaft further comprising a recess intermediate the pairs of surfaces for accommodating a portion of a wear adjuster mechanism, wherein the operating shaft further comprises a pin arranged to engage a corresponding input driving portion of the wear adjuster mechanism, the pin extending from the operating shaft at a non-zero angle with respect to the axes of rotation and the direction of force transmission.

BRIEF DESCRIPTION OF THE DRAWINGS

Embodiments of the present teachings will now be described, by way of example only, with reference to the accompanying drawings, in which:

FIG. 11 is a plan view of part of a brake-pad wear adjuster mechanism and the operating shaft of FIG. 10, with the slot of the drive drum included.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
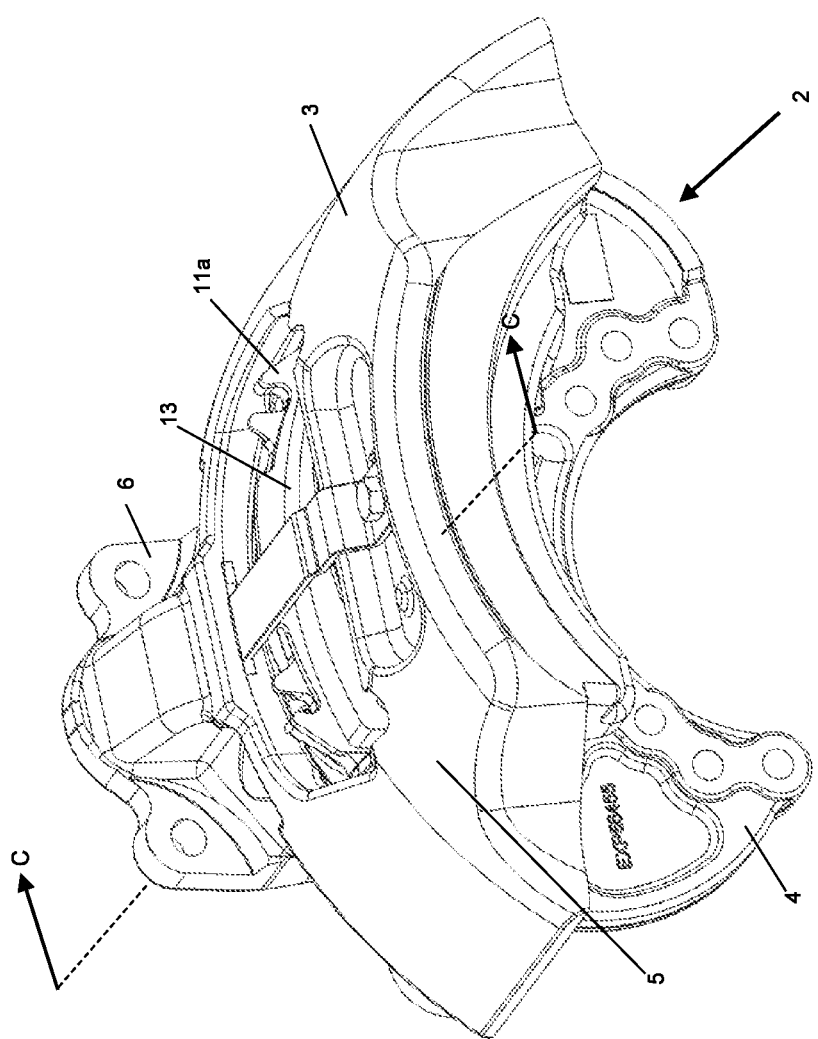
FIG. 1 is an isometric view of a brake including an operating shaft according to an embodiment of the present teachings.
Figure 2:
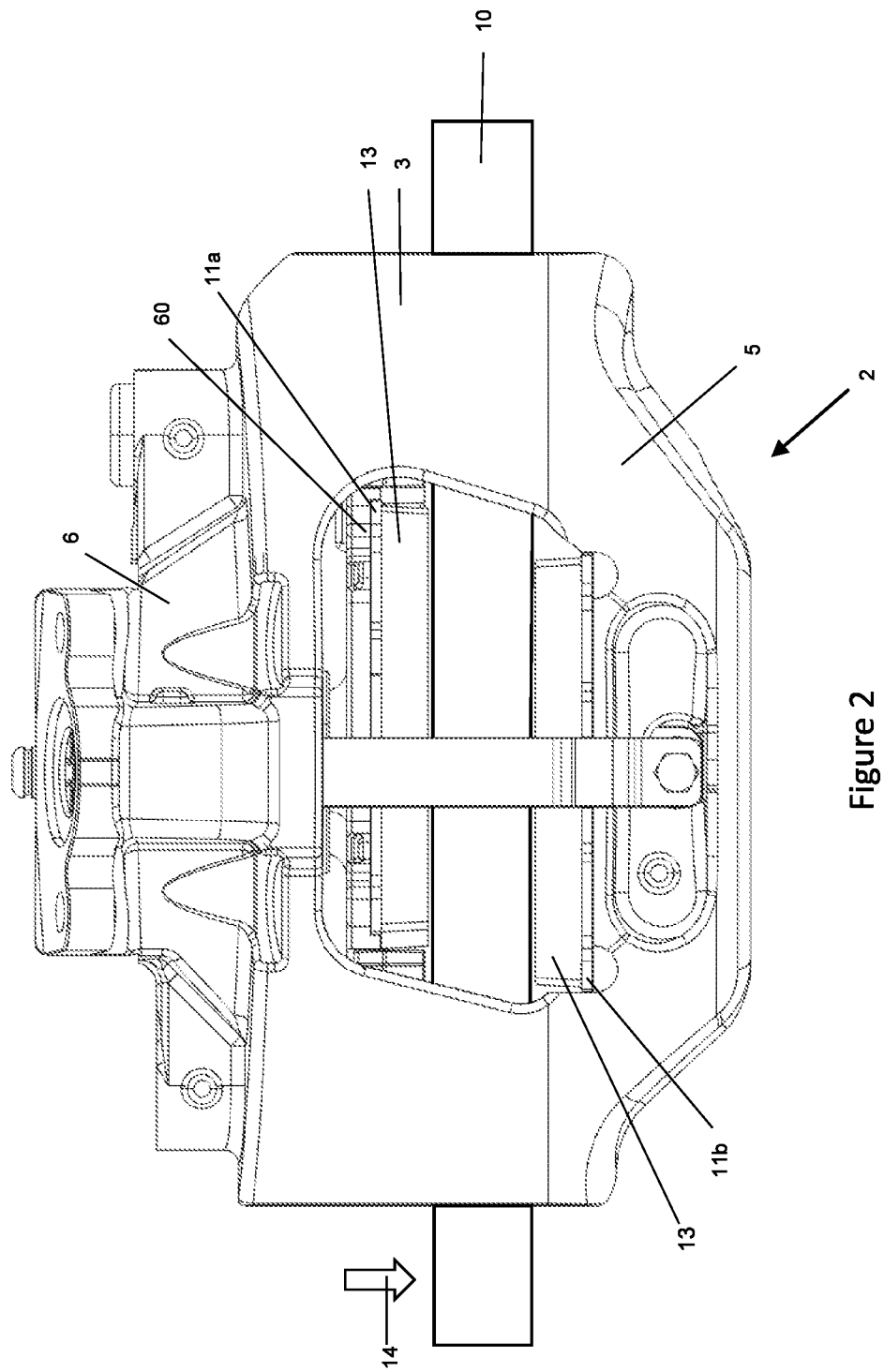
FIG. 2 is a plan view of the brake of FIG. 1, with a brake rotor in situ.
Figures 3, 4:
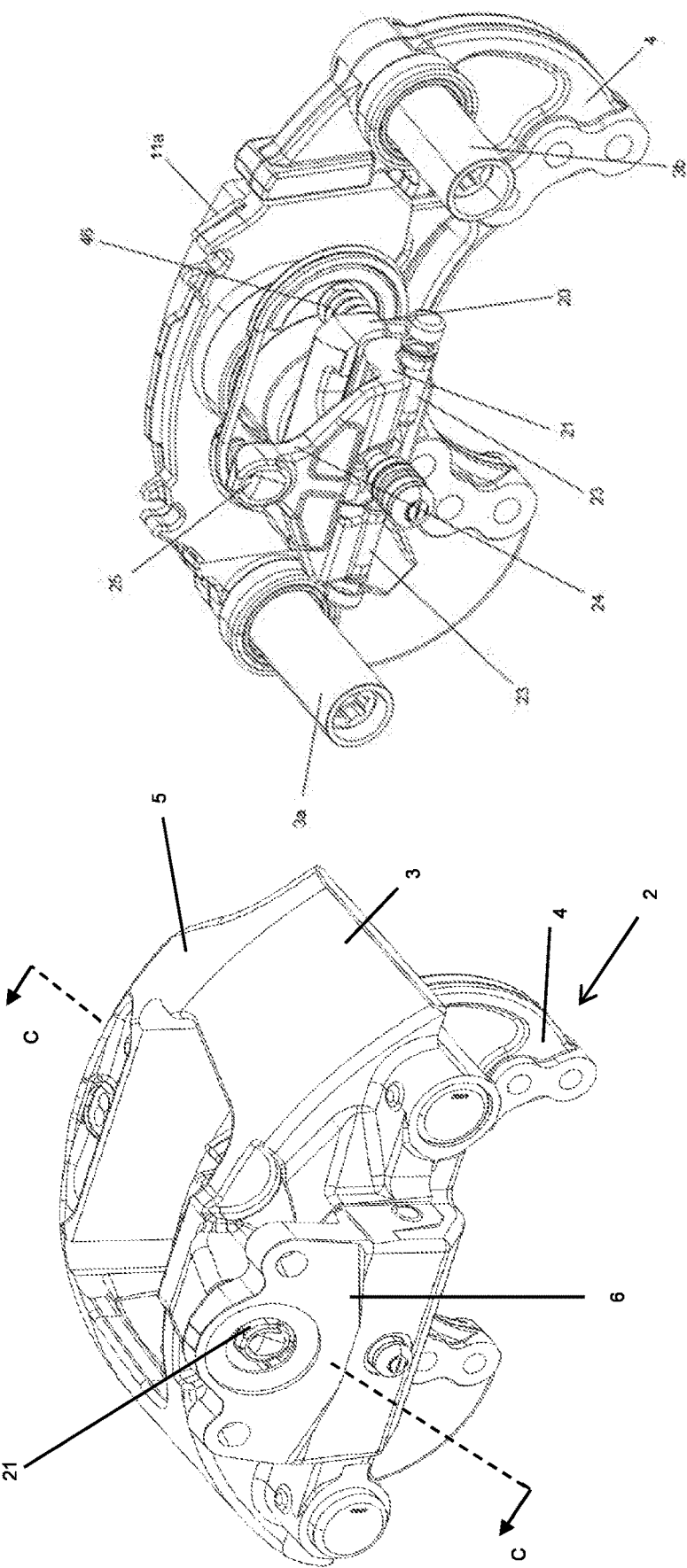
FIG. 3 is an isometric view of the brake of FIG. 1 from an inboard direction, with the inboard and outboard brake pads omitted for clarity.
FIG. 4 is an isometric view of the brake of FIG. 1 from an inboard direction, with the outboard brake pad and a caliper housing of the brake omitted for clarity.

FIGS. 1, 2 and 3 illustrate a disc brake 2 incorporating an operating shaft 21 of the present teachings. The disc brake incorporates an actuating mechanism comprising a single piston suitable for a commercial vehicle. This type of brake is particularly, but not exclusively, suitable for lighter duty heavy vehicles, for example smaller trucks, or a trailer of a tractor-trailer combination.

Various orientations of the disc brake are described. In particular, the directions inboard and outboard refer to the typical orientation of the disc brake when fitted to a vehicle. In this orientation the brake pad closest to the center of the vehicle is the pad directly actuated by an actuation mechanism and being the inboard pad, and the outboard pad being one mounted to a bridge portion of the caliper. Thus, inboard can be equated with an actuating side of the disc brake, and outboard with a reaction side. The terms radial, circumferential, tangential and chordal describe orientations with respect to the brake rotor. The terms vertical and horizontal describe orientations with the disc brake mounted uppermost on an axle, whereas it will be appreciated that in use such a disc brake may adopt any axle orientation depending upon packaging requirements of the vehicle.

The disc brake 2 comprises a caliper 3 having a housing 6 to accommodate the actuation mechanism and which is slideably mounted on a carrier 4 for movement in an inboard-outboard direction.

As can be seen from the view in FIG. 4 with the housing 6 omitted, the caliper 3 can slide on the carrier 4, by way of first and second guide pins 3a, 3b. In this embodiment, the first guide pin 3a is longer than the second guide pin 3b.

A friction element in the form of an inboard brake pad 11a comprises a layer of friction material 13 and is arranged so that the friction material 13 faces a brake rotor 10 (also known as a brake disc). The inboard brake pad 11a is mounted to a brake pad support arrangement. In this embodiment, the inboard brake pad support arrangement is a spreader plate 60, described in more detail below. The inboard brake pad 11a is moveable in a direction of force application denoted by an arrow 14 (see FIG. 2) against the brake rotor 10 (example of rotor shown schematically in FIG. 2).

A further friction element in the form of an outboard brake pad 11b, also with a layer of friction material 13, is also provided. The outboard brake pad 11b is mounted to a further brake support arrangement. Suitable means are provided to urge an outboard brake pad 11b against the opposite side of the rotor 10. In this embodiment, such means comprises a bridge 5 arranged so as to straddle the rotor 10 and to transmit the reaction force from an inboard operating shaft 21 to the outboard brake pad 11b. In this embodiment, the housing 6 and bridge 5 are manufactured as a single monolithic casting, but in other embodiments, the bridge may be bolted or otherwise secured to the housing. In this embodiment, the inboard and outboard brake pads 11a, 11b are mounted asymmetrically across an axis parallel to the brake rotor 10. The inboard brake pad 11a is mounted in a position that is laterally offset from the actuation mechanism, i.e., the line of action of the actuation mechanism does not pass through the mid-point of the inboard pad in a circumferential direction. The outboard brake pad 11b is mounted directly opposite the actuation mechanism, i.e., it is not laterally offset; the line of action of the actuation mechanism does pass through the mid-point of the outboard brake pad 11b in a circumferential direction when the outboard brake pad 11b is mounted. In other embodiments (see e.g., FIG. 6), the inboard and outboard brake pads 11a and 11b may not be laterally offset—i.e., may be aligned—or may be offset in another way.

Figure 5:
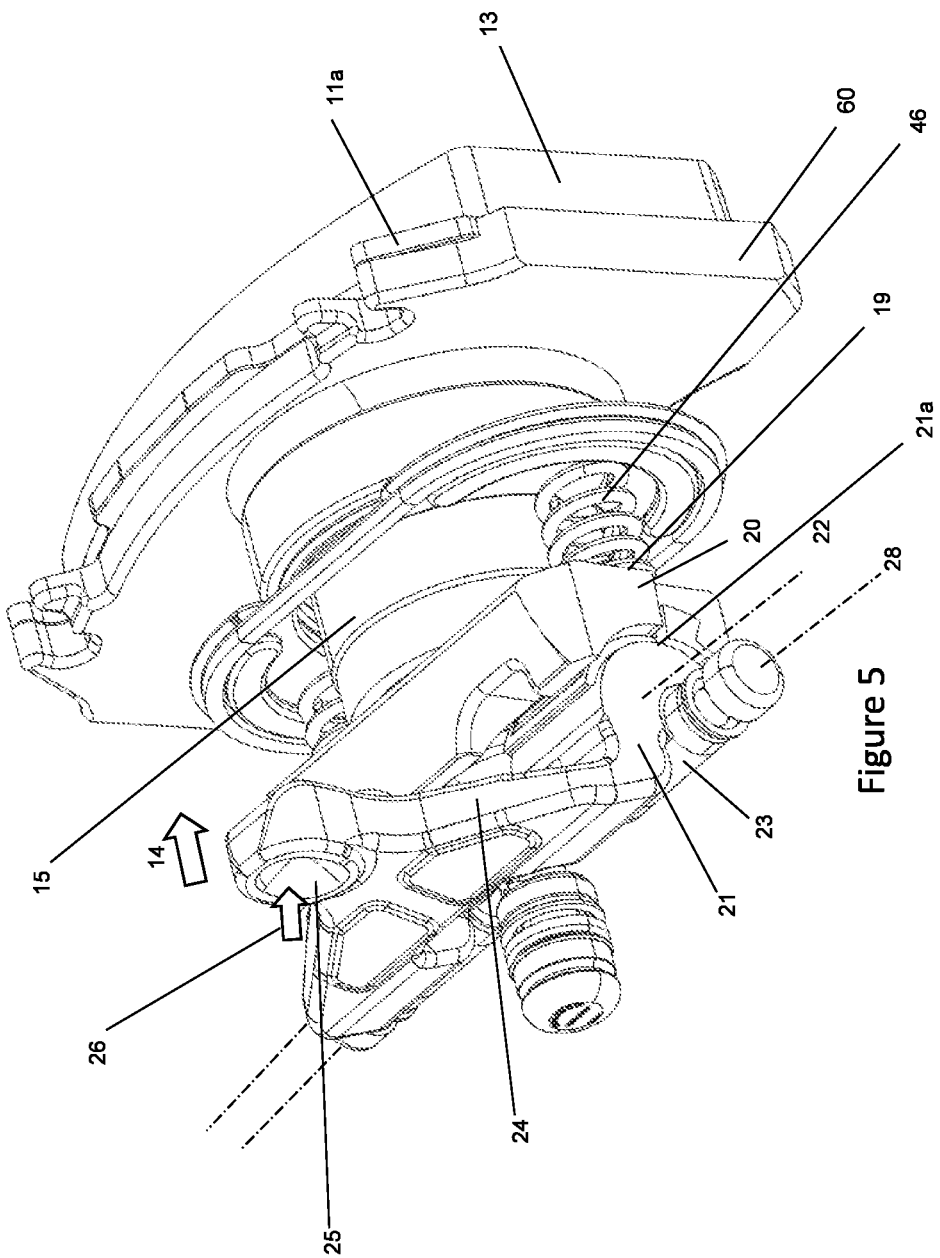
FIG. 5 is an isometric view showing an actuator arrangement of the brake of FIG. 1, with the inboard brake pad included.
Figure 6:
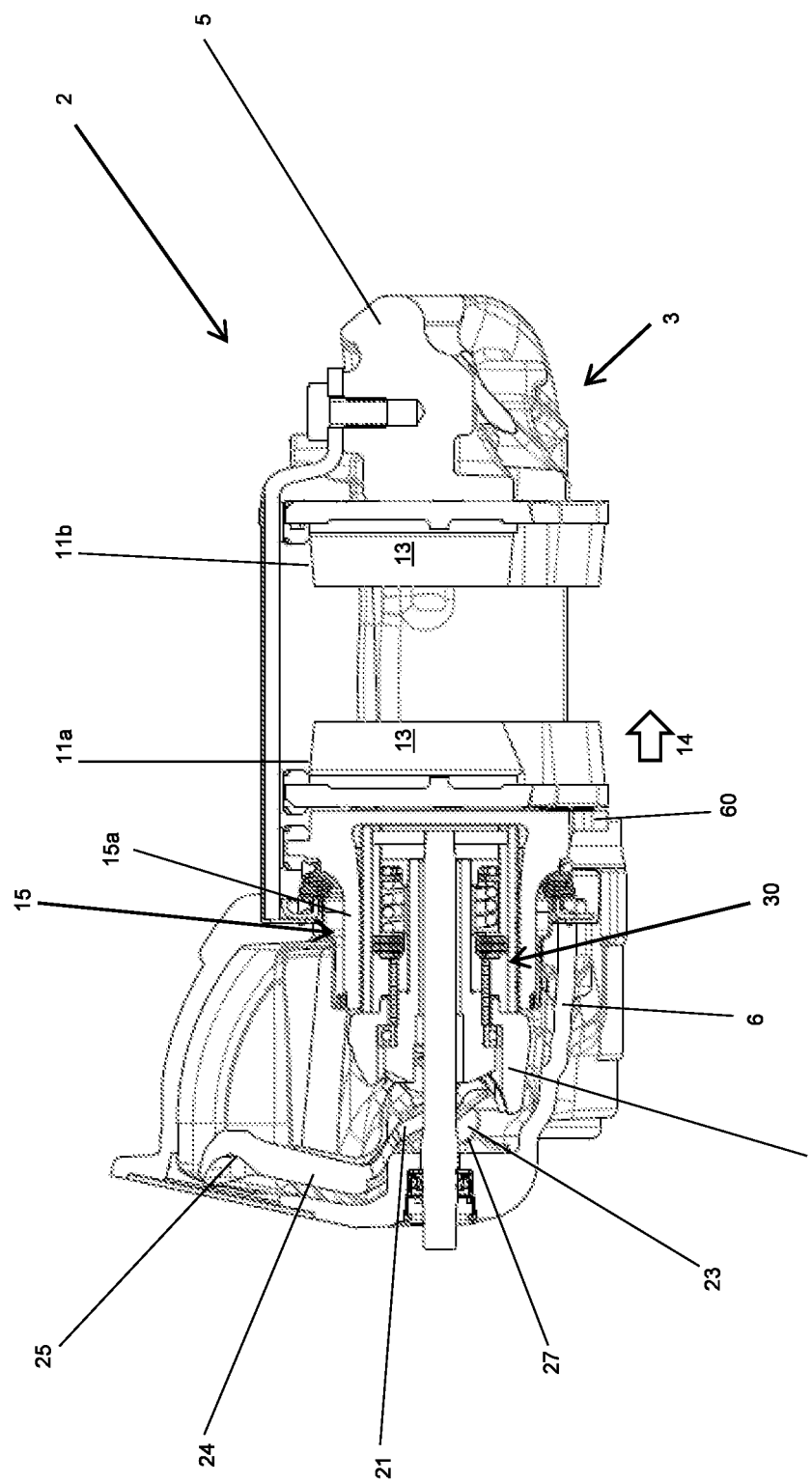
FIG. 6 is a cross-sectional view through an inboard-outboard radial plane similar to plane C-C of a brake of FIG. 1 but for a brake having a differing pad support arrangement and which has aligned pads.

With reference to the cut-away view of FIG. 5 and cross-section of FIG. 6 in particular, the inboard actuation mechanism comprises a single brake piston 15, slidable in the direction of arrow 14 (i.e., inboard-outboard) relative to the rotor 10 (FIG. 2).

Figure 8:
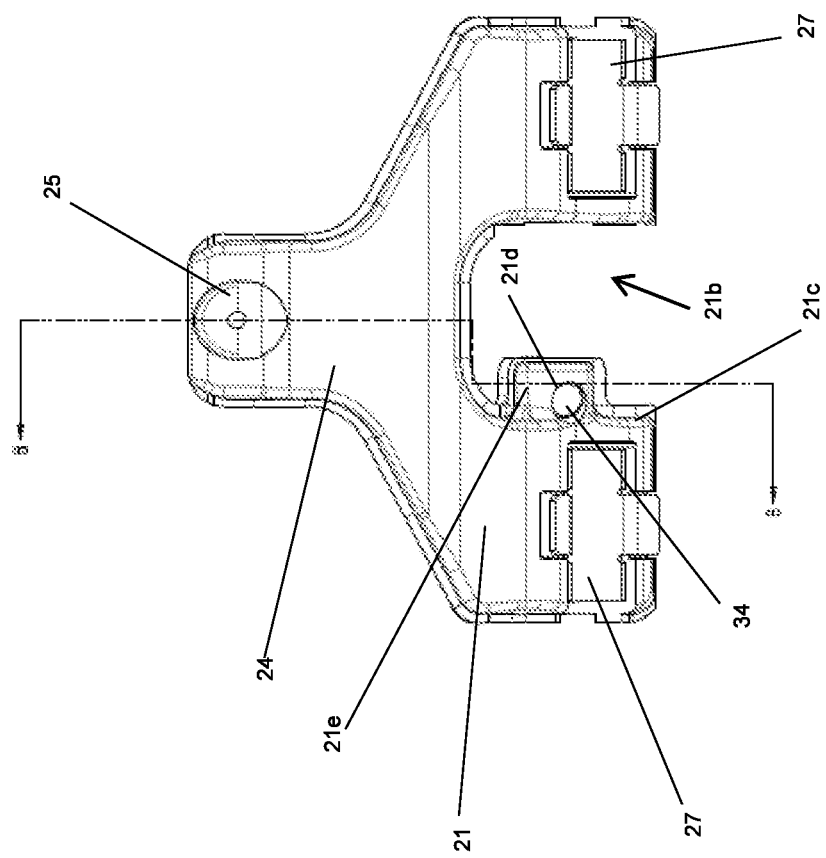
FIG. 8 is an end view of an inboard face of an operating shaft of the brake of FIG. 6 and also suitable for use in the brake of FIG. 1.
Figure 10:
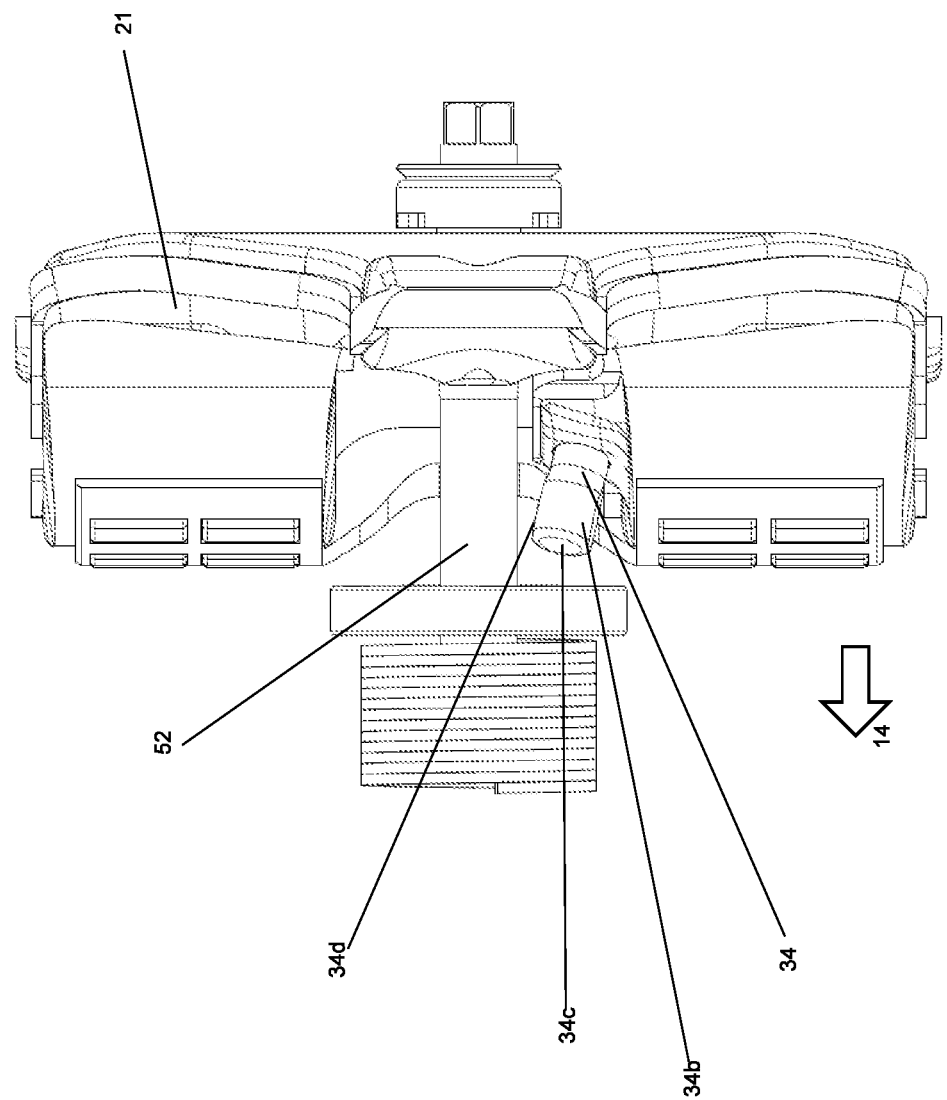
FIG. 10 is a plan view of part of a brake-pad wear adjuster mechanism and the operating shaft of FIG. 8, with a slot of a drive drum omitted for clarity.

In order to urge the piston assembly in the direction of arrow 14, the operating shaft 21 is pivoted about rollers 23 which are located along a transverse axis 28. In this embodiment, there are two rollers 23, which are spaced from one another laterally. Each roller 23 is located on a single bearing surface 27, each surface 27 being curved to accept the roller 23. Convex curved surfaces 21a of the operating shaft 21 are located opposite the roller 23. The operating shaft has an axis 22, being the radial center of the arc defined by the curved surfaces 21a, which is parallel and offset from the axis 28. The curved surfaces 21a locate in a semi-circular recess of a yoke 20. A surface 19 of the yoke 20 opposite the recess is in contact with an inboard end face of the piston 15. The operating shaft 21 further comprises a lever 24 having a pocket 25 configured to receive an output push rod (not shown) of a brake actuator (e.g., an air chamber). The lever 24 is, in this embodiment, shaped as an inverted "U" (see FIG. 8 in particular) and the line of action of the brake actuator (from pocket 25) is substantially over the line of action of the piston 15.

Located between the curved surfaces 21a and the recess of the yoke 20, on either arm of the 'U' are needle roller bearings 20a, to enable the operating shaft 21 to pivot around the roller 23, in the recess of the yoke 20.

In other embodiments, another form of cam surface instead of the curved surfaces 21a of the operating shaft 21 may be employed (e.g., a plain bearing) and/or the arrangement may be reversed with the rollers 23 being in contact with the yoke 20, and the curved surfaces 21a being located in the recess of the caliper housing 6.

The yoke 20 further includes a sleeve portion 40, which projects axially outboard from the yoke 20. The yoke 20 has a through bore extending axially through its center, the bore also extending through the center of the sleeve portion 40. The diameter of the bore at the sleeve portion 40 is lower than the diameter of bore for the remainder of the yoke, such that an internal shoulder 40a is defined between the sleeve portion 40 and the remainder of the yoke 20. The shoulder 40a defines an annular surface that faces in an inboard direction.

In this embodiment, the sleeve portion 40 and yoke 20 are integral but in other embodiments may be separate components that are fixed together during assembly, in any suitable way.

Application of a force in the direction of arrow 26 (FIG. 5) causes pivoting movement of the operating shaft 21 about the rollers 23 and the curved surfaces 21a bears on the yoke 20. The offset axes 28 and 22 cause the yoke 20 to move in the direction of the piston 15, contacting the piston 15 and causing the piston 15 to urge the friction material 13 of the inboard brake pad 11a directly against the rotor 10. A reaction force from the operating shaft 21 is transmitted to the bearing surface 27 of the caliper 3 via the rollers 23 and is then transmitted to the outboard brake pad 11b via the bridge 5, with the friction material 13 of the outboard brake pad 11b being urged against the rotor 10, such that the brake pads 11a and 11b clamp the rotor and effect braking through a frictional brake force. In this embodiment, it should be noted that the piston is not itself directly guided with the caliper. Rather, at the outboard end the position of the piston transverse its line of action is determined by interaction of a spreader plate with the brake carrier. In alternative embodiments, the piston may instead be guided.

A wear adjuster mechanism 30 to maintain a desired running clearance between the rotor 10 and brake pads 11a, 11b is described below. Generally, the operating shaft 21 is connected to a one-way clutch to transfer any rotation of the operating shaft beyond a predetermined degree. Between the one-way clutch and operating shaft is a link member, which is driven by the operating shaft and drives the one-way clutch. The one-way clutch has a driving portion configured to rotate if the link member rotates, and a driven portion mounted on the driving portion, that is driven by the driving portion. In this embodiment, the driving portion is a drive drum 35 with the driven portion being a driven drum 37. With particular reference to FIGS. 8-11, in this embodiment, the link member is a pin 34 that projects axially outboard from the operating shaft 21 from a position offset from the axis of the drive drum 35. The pin is in communication with a corresponding slot 35d in the drive drum, such that as the operating shaft 21 pivots in use, the pin engages within the slot to cause the drive drum 35 to rotate, as discussed in more detail below.

With reference to FIGS. 8 to 11 in particular, it can be seen that the inverted U-shape of the operating shaft 21 defines a recess or gap 21b intermediate the pairs of surfaces 21a for accommodating a portion of the wear adjuster mechanism. The pin 34 extends from the operating shaft 21 at a non-zero angle with respect to the axes of rotation 28, 22 and the direction of force transmission. Specifically, in this embodiment a is approximately 78° with respect to axes 22 and 28 and 12° with respect to the direction of force transmission. In other embodiments, it may be in the range of 55-85° or 60-80°. Orientating the pin 34 within this range of angles facilitates its engagement with the slot 35d over the full range of motion of the operating shaft 21 because the ratio of rotation of the operating shaft 21 to the drive drum remains close to 1:1.

The pin extends at this angle from a side wall of the recess or gap 21b.

In this embodiment, the pin 34 is a separate component from the operating shaft 21 and is mounted to the operating shaft. The operating shaft is manufactured in a forging process, the nature of which would prevent the pin being formed at or near net shape, meaning some form of machining would be required. Machining a pin 34 at the orientation and shape needed would be problematic. Further, as the pin 34 is needed to contact and drive the wear adjuster mechanism with a degree of sliding contact over repeated adjustment cycles. The pin needs to be both strong and wear resistant. As such, the pin 34 typically requires a different material to the operating shaft and/or may require some form of heat treatment, induction hardening or other form of hardening treatment. As a result, the required pin characteristics are preferably achieved by manufacturing it as a separate component.

As a result, the operating shaft 21 comprises a hole 21c arranged to receive a separate pin 34.

To simplify the fitting of the pin 34 to the hole, the pin is dimensioned to be a press-fit or interference fit within the hole 21c. In addition, the pin may have a textured, e.g., knurled, surface finish on its shank 34a to aid mechanical engagement of the pin with the hole. In other embodiments, the pin may be welded, brazed, adhesively secured, or threadably secured into the hole. In this embodiment the hole 21c and shank 34a are tapered, but in other embodiments may be non-tapered.

In order for the pin to extend at the required angle within the recess, the operating shaft comprises a tongue 21e of material extending into the recess 21b. The hole 21d is provided in the tongue 21e. A tongue may be readily formed via forging, and the hole may then be readily drilled into the tongue at the desired angle a. It will be appreciated that different versions of the same range of disc brakes may require different pin angles and/or positions, and that the tongue 21e may be designed with sufficient material so as to be drilled at these positions/angles. As will further be appreciated, it is necessary for there to be enough material surrounding the hole, for there to be enough strength of tongue to support the pin during fitting and use. By angling the pin 34, it is possible to achieve this without the tongue 21e projecting too far into the recess so that it interferes with the positioning of the manual adjuster shaft 52, as discussed below.

The pin is provided with a part-spherical head 34b at the end of the shank 34a which is arranged to engage the corresponding slot 35d of the wear adjuster mechanism 30, as discussed below.

The part-spherical head 34b has a diameter greater than a shank 34a of the pin, which enables the pin to have smooth contact with the slot 35d as the operating shaft pivots and the pin drives the slot.

However, as the space occupied by the pin 34 is desirably minimized, surfaces of the pin which are not intended to be in contact with the slot 35d may be flattened to some extent, e.g., may be entirely flat. In particular, in this embodiment, the pin has a flattened region 34c at an end remote from a shank 34a thereof so as to minimize the overall depth of the operating shaft in the inboard-outboard direction. Further, the pin has a flattened region 34d on a surface that faces a lateral mid-point of the recess. This ensures that the pin has sufficient clearance to the manual adjuster shaft 52, as can be seen most clearly in FIG. 10.

In this embodiment, the pin 34 extends in a general direction of force application denoted by the arrow 14 by the operating shaft 21. However, in other embodiments it is possible that the pin extends in the generally opposite direction, i.e., direction in which the piston moves as the operating shaft is released.

In order to maintain contact between the pin and corresponding slot over the full range of articulation of the pin (up to approximately 50°, a longitudinal axis of the pin does not intersect the axes of rotation of the surfaces 21a, 23.

In this embodiment, the wear adjuster mechanism 30 is at least partially accommodated within the gap 21b. Specifically, the manual adjuster shaft 52 of the wear adjuster mechanism is accommodated in the gap 21b, this is because in this embodiment, access to the manual adjuster shaft 52 is needed at the inboard face of the caliper housing 6 and the shaft extends outboard to be in driving engagement with the wear adjuster mechanism 30.

The drive drum 35 is made up of a collar portion 35a at its inboard end and an axially extending projecting 'finger' portion 35b, of a smaller diameter than the collar portion 35a, that extends outboard from the collar portion 35a, concentric with the piston 15. In this embodiment, located adjacent and outboard of the collar portion 35a of the drive drum 35, and concentrically radially outward from the finger portion 35b of the drive drum 35, is a driven drum 37. The driven drum 37 acts as the driven portion of the one-way clutch and is mounted on the drive drum 35. The driven drum 37 comprises a plurality of axially extending recesses 38 which are arranged to accommodate corresponding lugs projecting radially inwardly from input plates 41a of a friction clutch 41. In other embodiments, alternative arrangements for driving the clutch input plates are contemplated e.g., a different number of recesses, or projections rather than recesses. A wrap spring 39 is frictionally wrapped around outer circumferential surfaces of the collar portion 35a of the drive drum 35 and the driven drum 37, such that it bridges the two components and enables the two components to act as a one-way clutch. The wrap spring 39 can easily bridge the two components, as they are both cylindrical and have the same outer diameter at the location point where the wrap spring 39 engages. In other embodiments, other suitable one-way clutches may be utilized, such as ball and ramp, or roller clutch/sprag clutch arrangements.

Figure 7:
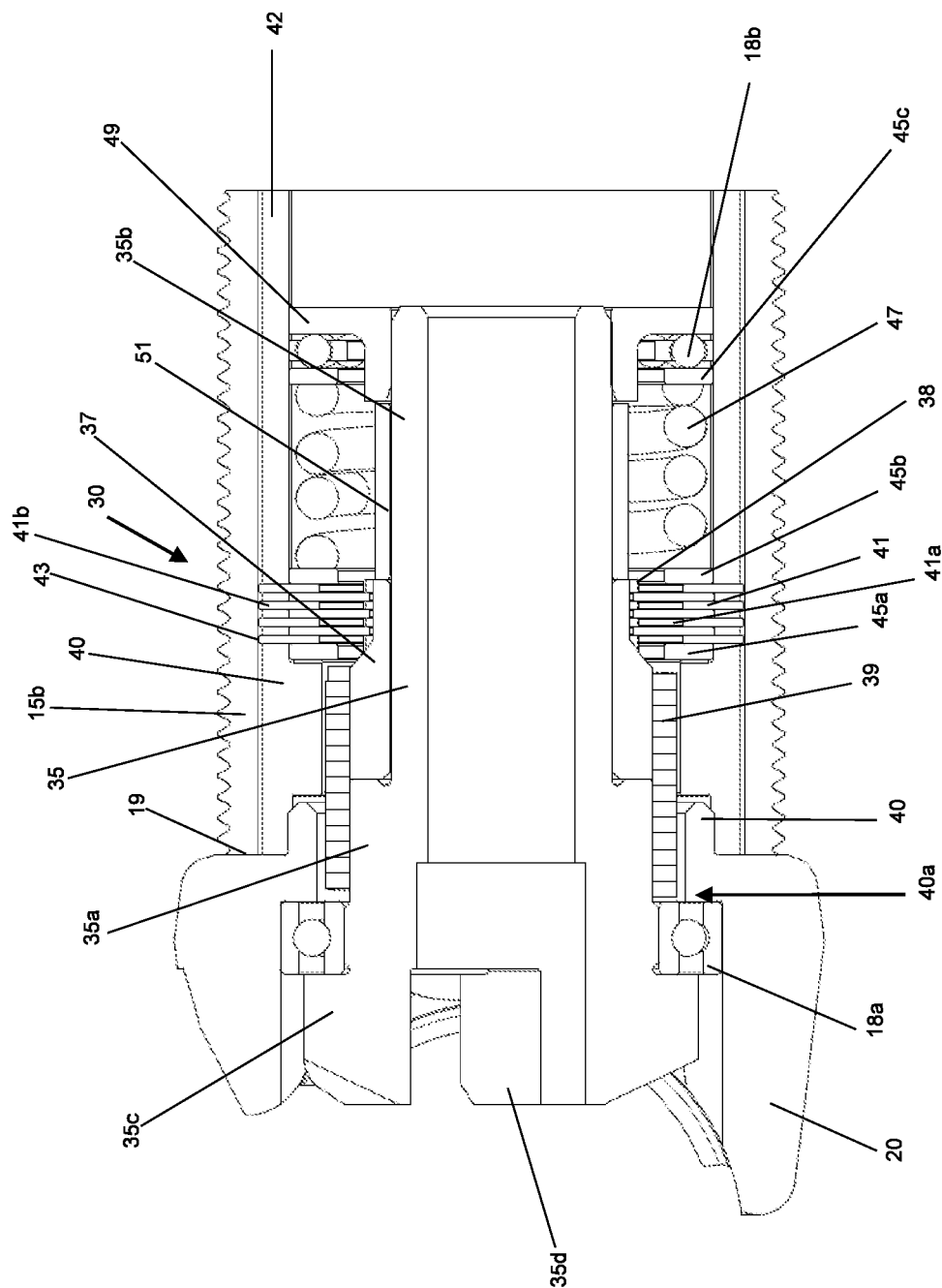
FIG. 7 is an enlarged cross-sectional view through the wear adjuster mechanism of the brake of FIG. 6.
Figure 9:
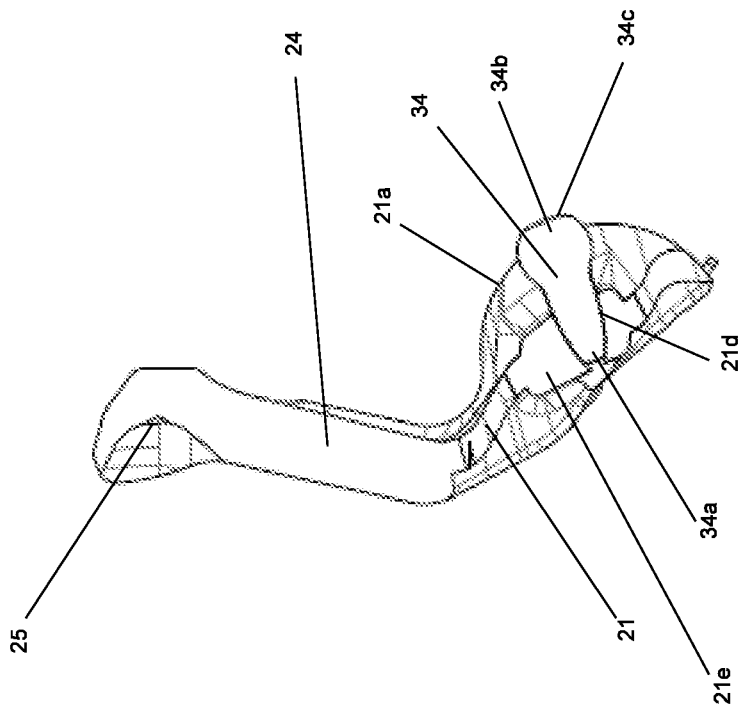
FIG. 9 is a side cross-sectional view through inboard-outboard radial plane B-B of the operating shaft of FIG. 8.

The friction clutch 41 comprises output plates 41b positioned between the input plates 41a (see FIG. 7 for more detail). The output plates 41b of the clutch 41 have diametrically opposite radially outwardly facing lugs 43, which are not present on the input plates 41a. Alternatively, a ball and ramp arrangement could be used instead of a friction clutch with input and output plates, as is known in the art.

As can be seen most clearly from FIG. 7, the drive drum 35 is restrained from moving in an outboard direction, and allowed to rotate relative to the yoke 20, by a first bearing 18a. The bearing 18a is an interference fit with the through bore of the yoke 20. An inboard facing surface of the bearing 18a engages an outboard facing surface of a flange portion 35c at the inboard end of the drive drum 35. An outboard facing surface of the bearing 18a engages the annular inboard facing surface of the shoulder 40a of the sleeve portion 40 of the yoke 20. In this way, the drive drum 35 is retained from moving axially outboard, once the brake is assembled. In this embodiment, the bearing 18a is a deep-groove ball bearing, to help ensure that it can take the axial loads that will be applied during operation of the brake. The bearing 18a also engages a radially outer surface of the collar 35a of the drive drum 35, to restrain the drive drum 35 from moving radially, and to take radial loads that pass through the drive drum 35. There is a clearance between the bearing 18a and the wrap spring 39. As well as helping enable smooth rotation of the drive drum 35 relative to the yoke 20, the bearing 18a also helps to locate the drive drum 35 radially, helping to prevent misalignment of the drive drum 35 within the wear adjuster mechanism 30, which can impair adjuster function.

The piston 15 comprises an outer piston 15a having an internal female thread, and an inner portion or inner piston 15b, having a complimentary external male thread. Therefore, in this embodiment the inner piston 15b is located within the outer piston 15a. The inner piston 15b has at least one recess in its inner surface. In this embodiment, the recesses are two longitudinally extending channels 42 located diametrically opposite one another. When the wear adjuster mechanism 30 is assembled, the lugs 43 of the output plates 41b of the clutch 41 locate within the channels 42, to key the output plates 41b to the inner piston 15b. Therefore, rotation of the output plates 41b results in rotation of the inner piston 15b.

The components above, that are located between the operating shaft 21 and inner piston 15b and outer piston 15a, define a transmission path of the wear adjuster mechanism 30.

When the wear adjuster mechanism 30 is assembled, the sleeve portion 40 of the yoke 20 is located concentrically between the wrap spring 39 and the inner piston 15b. The sleeve portion 40 is restrained from rotating, as it is secured to, or integral with, the yoke 20, which is also configured to be non-rotatable when assembled in the disc brake. However, the inner piston 15b is configured to rotate during an adjustment operation, to cause the piston 15 to advance in the direction of the inboard brake pad 11a. An outboard facing surface of the yoke contacts an inboard facing end surface of the inner piston 15b. Friction between these two surfaces helps to inhibit undesired vibration-induced torque from affecting the wear adjuster mechanism 30 in operation, and causing undesired de-adjustment of the disc brake. Advantageously, the friction provides a consistent friction torque but in a small space envelope.

The two surfaces are preferably arranged to have sufficient friction to resist relative rotation of the yoke 20 and the inner portion 15b of the piston 15 with a torque greater than the torque required to cause the one-way clutch of the wear adjuster mechanism 30 (in this case the wrap spring 39) to slip when the actuation force is released at the end of a braking operation. This helps to ensure that the one-way clutch slips rather than permits unwanted de-adjustment of the brake occurring during brake release. In this embodiment, the outboard facing surface of the yoke of the piston is hardened. In alternative embodiments, the inboard facing surface of the rotatable portion is hardened. It has been found that by hardening one of the two engaging surfaces, undesirable fretting corrosion can be significantly reduced.

The wear adjuster mechanism 30 additionally comprises first, second and third washers 45a, 45b, 45c. The first washer 45a is located adjacent and inboard of the friction clutch 41, and engages the friction clutch, as well as an outboard facing surface of the stop 44. The second washer 45b is located adjacent and outboard of the friction clutch 41, and an inboard surface of the washer 45b engages the friction clutch. An outboard face of the second washer 45b is acted on by a compression spring 47, the compression spring 47 being arranged concentrically within the inner piston 15b, between the second washer 45b and the third washer 45c. The compression spring 47 loads the friction clutch 41, to generate the required amount of friction to control the torque at which the friction clutch 41 slips. The compression spring 47 also controls the amount of friction between the outboard facing surface of the yoke and the inboard facing end surface of the inner piston 15b.

The compression spring 47 is pre-stressed by an end cap 49. In this embodiment, the end cap 49 is generally hat-shaped in cross-section, with a central bore so the end cap 49 can be mounted on the projecting finger portion 35b of the drive drum 35. The end cap 49 has a sleeve portion projecting in an axially inboard direction. A second bearing 18b is provided between a radially outer surface of the sleeve portion of the end cap 49 and a radially inner surface of the inner piston 15b. In this embodiment, the second bearing 18b is a thrust bearing, but in alternative embodiments the second bearing 18b could be a deep-groove ball bearing. The end cap 49 engages the third washer 45c to pre-stress the compression spring 47. In this embodiment, the outboard surface of the end cap 49 is flush with the outboard surface of the projecting finger portion 35b of the drive drum 35. This helps a user to ensure that the end cap is mounted in the correct location during assembly of the wear adjuster mechanism 30. The end cap 49 is mounted within the inner piston 15b with an interference fit.

Between an inboard facing surface of the sleeve portion of the end cap 49 and an outboard facing surface of the driven drum 37 is an annular spacer element 51. The spacer element 51 is located on the projecting finger portion 35b of the drive drum 35. In this embodiment, the spacer element 51 has some play in the axial direction. In other words, an air gap is defined between the spacer element 51 and the drive drum 35 and/or the spacer element 51 and the sleeve portion of the end cap 49.

In this embodiment, the outer piston portion 15a is integral (i.e., formed monolithically from the same material by casting, or forging, for example) with the spreader plate 60. The spreader plate 60 locates the inboard brake pad 11a, as well as engages surfaces of the carrier 4. Therefore, the interaction of the spreader plate 60 and carrier 4 prevent rotation of the outer piston 15a in use.

In order to maintain a desired running clearance between the brake pads and rotor, the wear adjuster mechanism 30 is required to periodically advance the inboard brake pad 11a towards the rotor 10 to account for the loss of friction material 13, and to a lesser extent loss of material from the face of the rotor 10, due to wear.

A predetermined amount of play or backlash is provided in the system between the pin and slot of the operating shaft and driving portion of the wear adjuster mechanism 30, (or between the lugs of the input plates 41a of the clutch and the recesses 38, in other arrangements not shown in the figures). In a normal braking operation in which the running clearance is within the desired parameters, as the operating shaft 21 pivots, the play in the system means that no adjustment will occur.

If the running clearance is however greater than the desired range, the aforesaid play is taken up. Whilst there is excess running clearance to be taken up, this rotation is transmitted via the drive drum 35 to the wrap spring 39, causing the wrap spring 39 to rotate around the drive drum 35 and driven drum 37 in a direction which causes the wrap spring 39 to tighten, transmitting the rotation from the drive drum 35 to the driven drum 37. More specifically, this rotation is transmitted as the wrap spring bridges the two components, i.e., a first end of the wrap spring 39 engages an outer surface of the drive drum 35 and a second end of the wrap spring 39 engages an outer surface of the driven drum 37. Rotation of the driven drum 37 causes rotation of the input plates 41a of the friction clutch 41, due to the interaction of the recesses 38 and the lugs of the input plates 41a. Rotation of the input plates 41a results in rotation of the output plates 41b, due to the friction between the input and output plates 41a, 41b. As the lugs 43 of the output plates 41b engage the channels 42 of the inner piston 15b, the inner piston 15b is also caused to rotate.

Since the outer piston 15a is restrained from rotation by the engagement of the spreader plate 60 and the carrier 4, this causes a lengthening of the piston 15 to reduce the running clearance. At the point at which the friction material 13 comes into full contact with the rotor 10, the torque passing through the wear adjuster mechanism 30 will start to increase. When this torque increases to a level that is higher than the maximum torque value of the friction clutch 41, the friction clutch 41 slips and further extension of the outer piston 15a is prevented. Once the braking operation ceases, return springs 46 act to urge the operating shaft 21 back to its rest position. A corresponding retraction of the inner piston 15b is prevented since the wrap spring 39 relaxes and does not transmit a reverse rotation to the driven drum 37.

Preferably, the engagement between the inboard-facing surface of the inner piston 15b and the outboard-facing surface of the yoke is configured to resist relative rotation of the yoke 20 and inner piston 15b with a torque greater than the torque required to cause the one-way clutch (in this case the wrap spring 39) to slip, when the actuation force is released at the end of a braking operation. This helps to ensure that the wrap spring 39 slips rather than permitting unwanted de-adjustment of the brake occurring during brake release.

The co-axial mounting of the wear adjuster mechanism 30 within the piston 15 minimizes the space required by the mechanism within the caliper housing, resulting in a lighter, more compact housing.

As the wrap spring 39 directly engages the outer surface of the drive drum 35 and the driven drum 37, any potential backlash that may occur between the drive drum 35 and the wrap spring 39, or the driven drum 37 and the wrap spring 39, is minimized, which can help to reduce wear of the components. Uncontrolled unwinding of the wrap spring 39 is also minimized, which provides a more predictable, and hence controllable, friction level. The wear on the outer surfaces of the drums 35, 37 is also minimized. The arrangement also helps to remove uncertainties that may arise after manufacturing of the components, for example unpredictable tolerances, which may affect the function of the system.

It will be appreciated that numerous changes may be made within the scope of the present teachings. For example, in some embodiments the position of the pin and slot may be reversed—i.e., the pin may extend from the input driving portion at a non-zero angle and be driven by a surface of a slot provided adjacent the wall of the recess in the operating shaft. This would provide similar benefits to the arrangement described above. In some embodiments, the operating shaft may be reconfigured to accept an input from a radially mounted air actuator (an actuator mounted at approximately 90° to the usual orientation). In this arrangement, the pin may be oriented at around 70° below the axis along which the piston moves during brake application, as the operating shaft will be pivoting in the opposite sense to the operating shaft depicted in FIGS. 8 and 9.

In addition, the present teachings may be applicable to other types of brake, such as twin piston or electromechanically actuated brakes.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An operating shaft for a disc brake, the operating shaft comprising:
    opposed pairs of arcuate surfaces arranged with offset axes of rotation, one arcuate surface of each pair adapted to be grounded to a housing of the disc brake and the other arcuate surface of each pair adapted to transmit an actuating force to a brake pad of the disc brake upon rotation of the operating shaft;
    a recess intermediate the pairs of arcuate surfaces for accommodating a portion of a wear adjuster mechanism; and
    a pin adapted to engage a corresponding input driving portion of the wear adjuster mechanism, wherein the pin extends at a non-zero angle with respect to both the axes of rotation and a direction of transmission of the actuating force, and wherein the pin has a longitudinal axis, and wherein the longitudinal axis of the pin does not intersect the axes of rotation.

2. The operating shaft of claim 1 wherein the pin is a separate component from the operating shaft or input driving portion and is mounted to the operating shaft or input driving portion.

3. The operating shaft of claim 2 wherein the operating shaft or input driving portion comprises a hole arranged to receive the pin.

4. The operating shaft of claim 3 wherein the pin is dimensioned to be a press-fit or interference fit within the hole.

5. The operating shaft of claim 1 wherein the pin is provided with a part-spherical head.

6. The operating shaft of claim 5 wherein the part-spherical head has a diameter greater than a shank of the pin.

7. The operating shaft of claim 1 wherein the pin has a flattened region at an end remote from a shank of the pin.

8. The operating shaft of claim 1 wherein the pin has a flattened region on a surface that faces a lateral midpoint of the recess.

9. The operating shaft of claim 1 wherein the pin extends adjacent to a wall of the operating shaft defining a perimeter of the recess.

10. The operating shaft of claim 1 wherein the operating shaft comprises a tongue of material extending into the recess and a hole is provided in the tongue.

11. The operating shaft of claim 1 wherein the non-zero angle is between 55° and 85° with respect to the axes of rotation.

12. A disc brake adapted to be air, hydraulically or electrically actuated, the disc brake comprising:
    a housing;
    a wear adjuster mechanism having an input driving portion; and
    an operating shaft that includes:
        opposed pairs of arcuate surfaces arranged with offset axes of rotation, one arcuate surface of each pair arranged to be grounded to the housing and the other arcuate surface of each pair arranged to transmit an actuating force to a brake pad of the disc brake upon rotation of the operating shaft;
        a recess intermediate the pairs of arcuate surfaces for accommodating a portion of the wear adjuster mechanism; and
        a pin arranged to engage a corresponding slot of the input driving portion;
    wherein the pin extends at a non-zero angle with respect to both the axes of rotation and a direction of transmission of the actuating force, and wherein the pin has a longitudinal axis, and wherein the longitudinal axis of the pin does not intersect the axes of rotation.

13. The disc brake of claim 12 wherein the wear adjuster mechanism comprises a manual adjuster shaft at least partially disposed in the recess.

14. An operating shaft for a disc brake, the operating shaft comprising:
    opposed pairs of arcuate surfaces arranged with offset axes of rotation, one arcuate surface of each pair adapted to be grounded to a housing of the disc brake and the other arcuate surface of each pair adapted to transmit an actuating force to a brake pad of the disc brake upon rotation of the operating shaft;
    a recess intermediate the pairs of arcuate surfaces for accommodating a portion of a wear adjuster mechanism;
    a pin adapted to engage a corresponding input driving portion of the wear adjuster mechanism, the pin extending from the operating shaft at a non-zero angle with respect to the axes of rotation and a direction of force transmission; and a tongue of material extending into the recess:
  wherein a hole is provided in the tongue, the hole arranged to receive the pin.

15. The operating shaft of claim 14 wherein the pin is dimensioned to be a press-fit or interference fit within the hole.

16. The operating shaft of claim 14 wherein the pin is provided with a part-spherical head.

17. The operating shaft of claim 16 wherein the part-spherical head has a diameter greater than a shank of the pin.

18. The operating shaft of claim 14 wherein the pin has a flattened region at an end remote from a shank of the pin.

19. The operating shaft of claim 14 wherein the pin has a flattened region on a surface that faces a lateral midpoint of the recess.

20. The operating shaft of claim 14 wherein the pin extends adjacent to a wall of the operating shaft defining a perimeter of the recess.

\* \* \* \* \*